US012658621B2

(12) United States Patent
Chen et al.

(10) Patent No.: US 12,658,621 B2
(45) Date of Patent: Jun. 16, 2026

(54) ELECTRICAL CONNECTOR AND ELECTRICAL CONNECTOR COMBINATION FIXABLE ON A CIRCUIT BOARD AND TO CONDUCTING WIRES

(71) Applicant: Molex, LLC, Lisle, IL (US)

(72) Inventors: You-Sheng Chen, Shanghai (CN); Wen-Chieh Liang, New Taipei (TW); Jing Liu, Dongguan (CN); Chien Ching Teh, Jurong Town (SG); Yueh-Ting Chiang, New Taipei (TW)

(73) Assignee: Molex, LLC, Lisle, IL (US)

( * ) Notice: Subject to any disclaimer, the term of this patent is extended or adjusted under 35 U.S.C. 154(b) by 545 days.

(21) Appl. No.: 18/099,979

(22) Filed: Jan. 23, 2023

(65) Prior Publication Data

US 2023/0238723 A1 Jul. 27, 2023

(30) Foreign Application Priority Data

Jan. 27, 2022 (CN) ......................... 202210101767.8

(51) Int. Cl.
*H01R 12/73* (2011.01)
*H01R 12/70* (2011.01)
(Continued)

(52) U.S. Cl.
CPC ......... *H01R 12/73* (2013.01); *H01R 12/7011* (2013.01); *H01R 12/727* (2013.01);
(Continued)

(58) Field of Classification Search
CPC .. H01R 12/73; H01R 12/7011; H01R 12/727; H01R 13/11; H01R 13/46; H01R 13/502;
(Continued)

(56) References Cited

U.S. PATENT DOCUMENTS 6,824,419 B1 11/2004 Wu
8,758,030 B2 * 6/2014 Chen ...................... H01R 12/62
439/493

(Continued)

FOREIGN PATENT DOCUMENTS

CN 111541070 A * 8/2020 ........... H01R 13/748
CN 212114065 U 12/2020
CN 212304123 U 1/2021

*Primary Examiner* — Justin M Kratt

(57) ABSTRACT

An example electrical connector is capable of being fixed to a circuit board and includes a first insulating housing having a front end provided with a first coupling cavity and a receiving cavity provided on a lateral side of and laterally aligned with the first coupling cavity. The electrical connector includes a plurality of first conductive terminals, respectively provided on upper and lower sides of the first coupling cavity, where each first conductive terminal includes a first contact portion extending forwards and a wiring portion extending backwards. The electrical connector further includes a plurality of conducting wires, respectively connected to the wiring portions of the plurality of first conductive terminals, and a second insulating housing, inserted into the receiving cavity of the first insulating housing. The electrical connector also includes a plurality of second conductive terminals, fixed on the second insulating housing.

20 Claims, 9 Drawing Sheets

(51) Int. Cl.

| | |
|---|---|
| ***H01R 12/72*** | (2011.01) |
| ***H01R 13/11*** | (2006.01) |
| ***H01R 13/46*** | (2006.01) |
| ***H01R 13/502*** | (2006.01) |
| ***H01R 13/6461*** | (2011.01) |
| ***H01R 13/658*** | (2011.01) |
| ***H01R 13/6591*** | (2011.01) |
| *H01R 12/71* | (2011.01) |
| *H01R 12/75* | (2011.01) |
| *H01R 13/10* | (2006.01) |
| *H01R 13/504* | (2006.01) |
| *H01R 13/514* | (2006.01) |
| *H01R 13/516* | (2006.01) |
| *H01R 13/518* | (2006.01) |
| *H01R 13/648* | (2006.01) |
| *H01R 13/652* | (2006.01) |
| *H01R 13/6597* | (2011.01) |
| *H01R 27/02* | (2006.01) |

(52) U.S. Cl.

CPC ............. *H01R 13/11* (2013.01); *H01R 13/46* (2013.01); *H01R 13/502* (2013.01); *H01R 13/6461* (2013.01); *H01R 13/658* (2013.01); *H01R 13/6591* (2013.01); *H01R 12/71* (2013.01); *H01R 12/716* (2013.01); *H01R 12/72* (2013.01); *H01R 12/721* (2013.01); *H01R 12/722* (2013.01); *H01R 12/725* (2013.01); *H01R 12/75* (2013.01); *H01R 13/10* (2013.01); *H01R 13/112* (2013.01); *H01R 13/504* (2013.01); *H01R 13/5045* (2013.01); *H01R 13/514* (2013.01); *H01R 13/516* (2013.01); *H01R 13/518* (2013.01); *H01R 13/648* (2013.01); *H01R 13/652* (2013.01); *H01R 13/6597* (2013.01); *H01R 27/02* (2013.01)

(58) Field of Classification Search

CPC .............. H01R 13/6461; H01R 13/658; H01R 13/6591; H01R 12/71; H01R 12/716; H01R 12/72; H01R 12/721; H01R 12/722; H01R 12/725; H01R 12/75; H01R 13/10; H01R 13/112; H01R 13/504; H01R 13/5045; H01R 13/514; H01R 13/516; H01R 13/518; H01R 13/648; H01R 13/652; H01R 13/6597; H01R 27/02

See application file for complete search history.

(56) References Cited

U.S. PATENT DOCUMENTS

| | | | | |
|---|---|---|---|---|
| 2020/0144751 | A1* | 5/2020 | Suda .................. | H01R 13/6585 |
| 2021/0234291 | A1 | 7/2021 | Zerebilov | |
| 2023/0187876 | A1* | 6/2023 | Yao .................... | H01R 13/6273<br>439/438 |
| 2023/0396014 | A1* | 12/2023 | Miyamura ....... | H01R 13/62927 |

* cited by examiner

ELECTRICAL CONNECTOR AND ELECTRICAL CONNECTOR COMBINATION FIXABLE ON A CIRCUIT BOARD AND TO CONDUCTING WIRES

RELATED APPLICATIONS

This application claims priority to Chinese Patent Application Serial No. 202210101767.8, filed Jan. 27, 2022, which is incorporated herein by reference in its entirety.

TECHNICAL FIELD

The present invention relates to the technical field of connectors, and particularly to an electrical connector and an electrical connector combination that facilitate space conservation and assembly.

BACKGROUND

The Chinese utility model patent CN 212114065 U discloses a connector provided on a riser card, the connector including: a riser card, provided with an accommodation slot in a middle portion thereof; a connector main body, fixed in the accommodation slot of the riser card, a plurality of connector terminals being mounted in the connector main body; a PCB board, contacting and connected to a front end of the connector terminal, a contact and connecting point being a first contact; and a cable, contacting and connected to a rear end of the connector terminal, and a contact and connecting point being a second contact. The first contact and the second contact are respectively located on two sides of the riser card.

All terminals on such a connector in the prior art are connected to other electronic apparatus by means of cables, and the riser card serves only as a fixed connector, thereby occupying a large space. However, some connector terminals of such a connector that are used to be connected to a power supply or a low-speed control signal further need to be connected to a circuit board, and some other connector terminals used to be connected to high-speed signals need to transmit signals via cables. Since such a connector has more cables and needs an additional circuit board, the assembly and cable sorting work are complex. In view of this, the connector needs further improvement.

SUMMARY

The technical problem to be solved by the present invention is to overcome the above-described defects in the prior art by providing an electrical connector and an electrical connector combination that facilitate space conservation and assembly.

The technical solutions employed in the present invention are as follows:

According to an aspect of the present invention, provided in the present invention is an electrical connector, capable of being fixed to a circuit board, the electrical connector comprising: a first insulating housing, having a front end provided with a first coupling cavity and a receiving cavity provided on a lateral side of the first coupling cavity; a plurality of first conductive terminals, respectively provided on upper and lower sides of the first coupling cavity, each first conductive terminal comprising a first contact portion extending forwards and a wiring portion extending backwards; a plurality of conducting wires, respectively connected to the wiring portions of the plurality of first conductive terminals; a second insulating housing, inserted into the receiving cavity of the first insulating housing; and a plurality of second conductive terminals, fixed on the second insulating housing, the second conductive terminal comprising a second contact portion extending forwards and a pin extending backwards, wherein the pin of the second conductive terminal is used to be electrically connected to the circuit board.

According to another aspect of the present invention, provided in the present invention is an electrical connector combination, comprising a circuit board and the above-described electrical connector fixed on the circuit board, an upper side of the circuit board being provided with an opening, the circuit board being provided with a plurality of electronic elements and a plurality of electrical contacts located on a side of the opening, the electrical connector being fixed in the opening, and the pins of the plurality of second conductive terminals being respectively correspondingly joined to the plurality of electrical contacts, so that the plurality of second conductive terminals are electrically connected to the plurality of electronic elements by means of the circuit board.

According to still another aspect of the present invention, provided in the present invention is an electrical connector, comprising: a first insulating housing, having a front end provided with a first coupling cavity; a plurality of first conductive terminals, each first conductive terminal comprising a first contact portion extending forwards, a wiring portion extending backwards, and a first connecting portion located between the first contact portion and the wiring portion, the plurality of first conductive terminals being divided into upper and lower rows respectively provided on upper and lower sides of the first coupling cavity, and the plurality of first conductive terminals comprising a plurality of ground terminals and a plurality of signal terminals; a first shielding plate, located between the upper and lower rows of the first conductive terminals, the first shielding plate being wavy, and extending in an arrangement direction of the first conductive terminals, and the first shielding plate having a plurality of first crest portions and a plurality of first trough portions arranged alternately up and down, wherein the first connecting portion of the ground terminal contacts the first shielding plate; and a plurality of conducting wires, respectively electrically connected to the wiring portions of the first conductive terminals.

Compared with the prior art, the present invention has at least the following advantages: in the electrical connector of the present invention, the wiring portion of the first conductive terminal and the pin of the second conductive terminal are electrically connected to different components. The wiring portions of the plurality of first conductive terminals are respectively electrically connected to the plurality of conducting wires. Using conducting wires to transmit high-frequency signals can ensure integrity of the high-frequency signals and reduce crosstalk, thereby improving transmission quality of high-frequency signals. The pins of the second conductive terminals are used to be electrically connected to a circuit board, so as to use the circuit board to achieve transmission of low-speed signals or a power supply, thereby leveraging the space occupied by the circuit board to achieve electrical functions related to the low-speed signals or the power supply, and facilitating space conservation. Further, these second conductive terminals do not need to be connected to conducting wires, thereby reducing conducting wires in the electrical connector, and allowing the electrical connector and the circuit board to be easily assembled. In addition, the second insulating housing is inserted in and connected to the first insulating housing from the front backwards. By inserting the second insulating housing, the second conductive terminals on the second insulating housing are easily electrically connected to the circuit board, thereby allowing assembly to be easily performed.

DETAILED DESCRIPTION OF THE PREFERRED EMBODIMENTS

Figure 1:
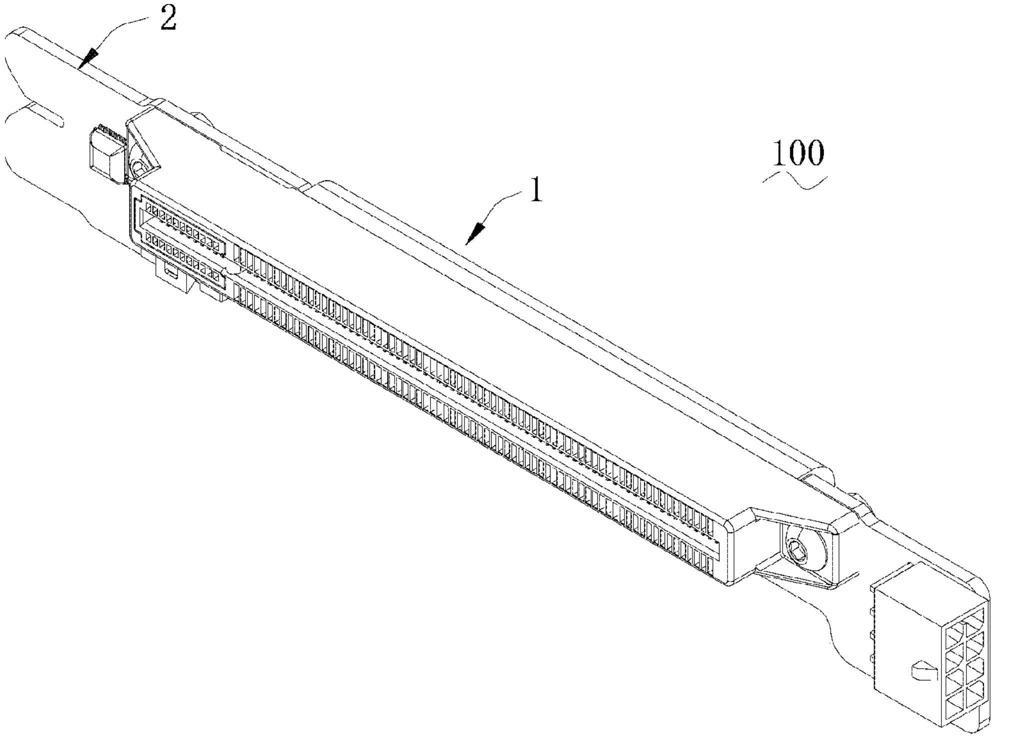
FIG. 1 is a perspective view of an electrical connector combination according to a preferred embodiment of the present invention.
Figure 2:
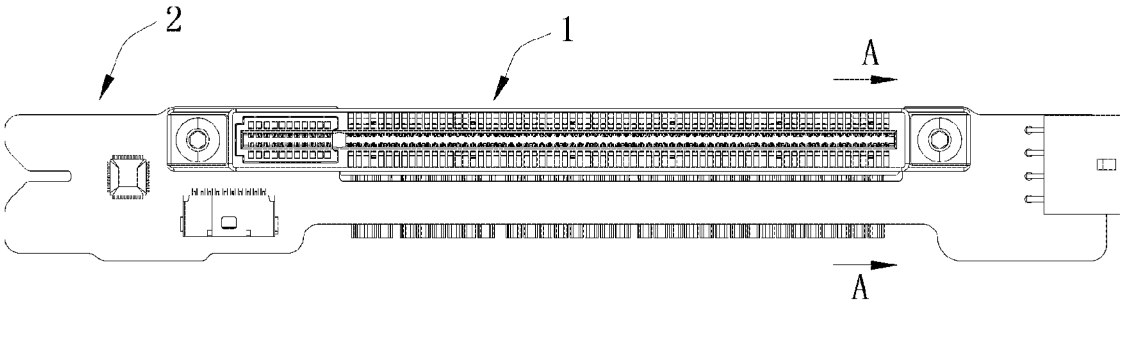
FIG. 2 is a front view of FIG. 1.

Although the present invention can be easily represented in different forms of embodiments, only some of specific embodiments are shown in the drawings and described in detail in this description, and it can be understood that this description should be regarded as an exemplary description of the principle of the present invention and is not intended to limit the present invention to what is described herein.

Therefore, a feature indicated in this description will be used to illustrate one of features of an embodiment of the present invention, instead of implying that each embodiment of the present invention necessarily has the described feature. In addition, it should be noted that this description describes many features. Although certain features can be combined to illustrate possible system designs, these features can also be used in other combinations not specified explicitly. Thus, unless otherwise stated, the illustrated combinations are not intended to be limiting.

In the embodiments shown in the drawings, the direction indications (such as up, down, left, right, front, and rear) are used to explain the structure and movement of the various elements of the present invention and are not absolute but relative. When these elements are in the positions shown in the drawings, these descriptions are appropriate. If the descriptions of the positions of these elements change, the indications of these directions also change accordingly.

Preferred embodiments of the present invention will be further described in detail below in conjunction with the drawings in this description.

Referring to FIG. 1 to FIG. 8, an electrical connector combination 100 of this preferred embodiment includes a circuit board 2 and an electrical connector 1 fixed on the circuit board 2. The circuit board 2 provides an adaptation function for the electrical connector 1. In addition, the circuit board 2 further has an electrical function, and is electrically connected to the electrical connector 1.

Figure 7:
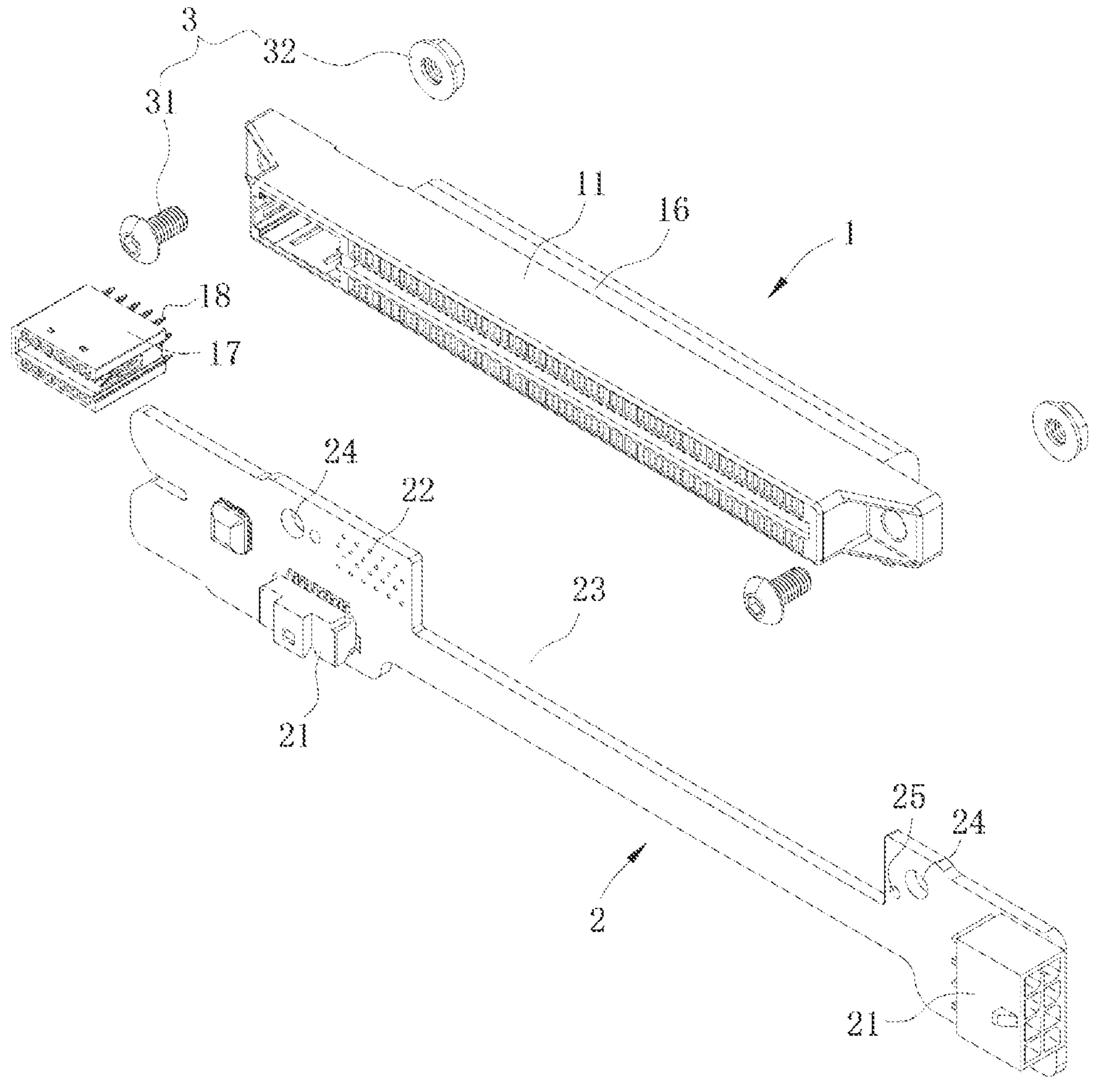
FIG. 7 and FIG. 8 are exploded perspective views of FIG. 1 from two different viewing angles.
Figure 8:
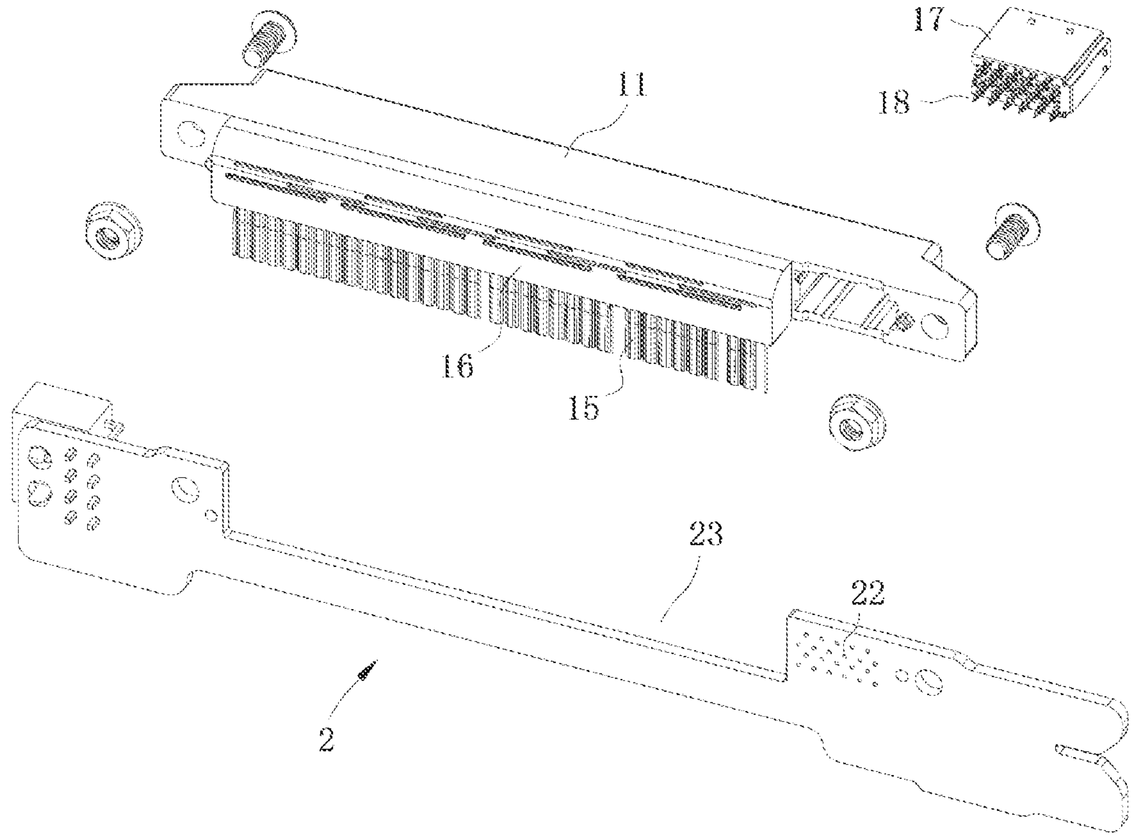

Referring primarily to FIG. 7 and FIG. 8, a plurality of electronic elements 21 and a plurality of electrical contacts 22 are provided on the circuit board 2. A conducting circuit is formed on the circuit board 2. The plurality of electronic elements 21 are electrically connected to the plurality of electrical contacts 22 by means of the conducting circuit on the circuit board 2. The plurality of electronic elements 21 include, for example, a power connector, a chip, a micro-switch, etc. These electrical contacts 22 are used to be connected to the electrical connector 1, so that the electrical connector 1 can be correspondingly electrically connected to these electronic elements 21 by means of the circuit board 2.

The circuit board 2 is vertical, and an upper side thereof is provided with an opening 23 by means of which the electrical connector 1 is mounted. A fixing hole 24 is further provided on each of two lateral sides of the opening 23 of the circuit board 2, and is used to receive a fastener 3, so as to fix the electrical connector 1 and the circuit board 2 to each other. The fastener 3 may be, for example, a screw 31 and a matching nut 32. The circuit board 2 is provided with a positioning hole 25 at a position close to each fixing hole 24, so that the electrical connector 1 is easily positioned during mounting.

The plurality of electronic elements 21 are distributed on the two lateral sides of the opening 23 of the circuit board 2. The plurality of electrical contacts 22 are all located on one lateral side of the opening 23. In this preferred embodiment, the plurality of electrical contacts 22 are arranged in an up-down direction to form four rows. Each row of the plurality of electrical contacts 22 are laterally spaced apart from each other. It can be appreciated that the arrangement of these electrical contacts 22 can be flexibly configured according to actual conditions. Preferably in this embodiment, the electrical contact 22 is a metalized through hole, and the electrical contact 22 passes through two surfaces of the circuit board 2. In some other embodiments not shown, the electrical contact 22 may also be in the structural forms such as a bonding pad, a soldering hole, etc.

Referring to FIG. 3 to FIG. 9, the electrical connector 1 of this preferred embodiment mainly includes a first insulating housing 11, a plurality of first conductive terminals 12 mounted in the first insulating housing 11, a plurality of conducting wires 15 respectively connected to the rear of the plurality of first conductive terminals 12, a second insulating housing 17 inserted into the first insulating housing 11, and a plurality of second conductive terminals 18 fixed in the second insulating housing 17. The electrical connector 1 of this embodiment further includes a protective housing 16 provided behind the first insulating housing 11.

Figure 9:
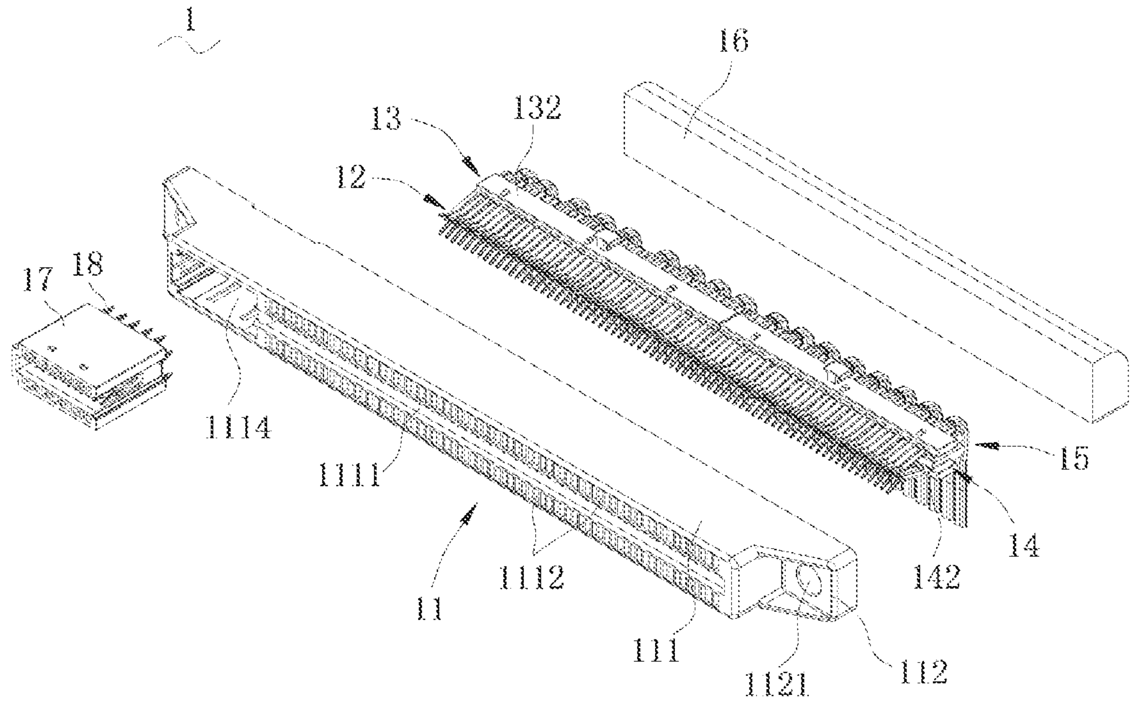
FIG. 9 is a further exploded perspective view of the electrical connector in FIG. 7.
Figure 10:
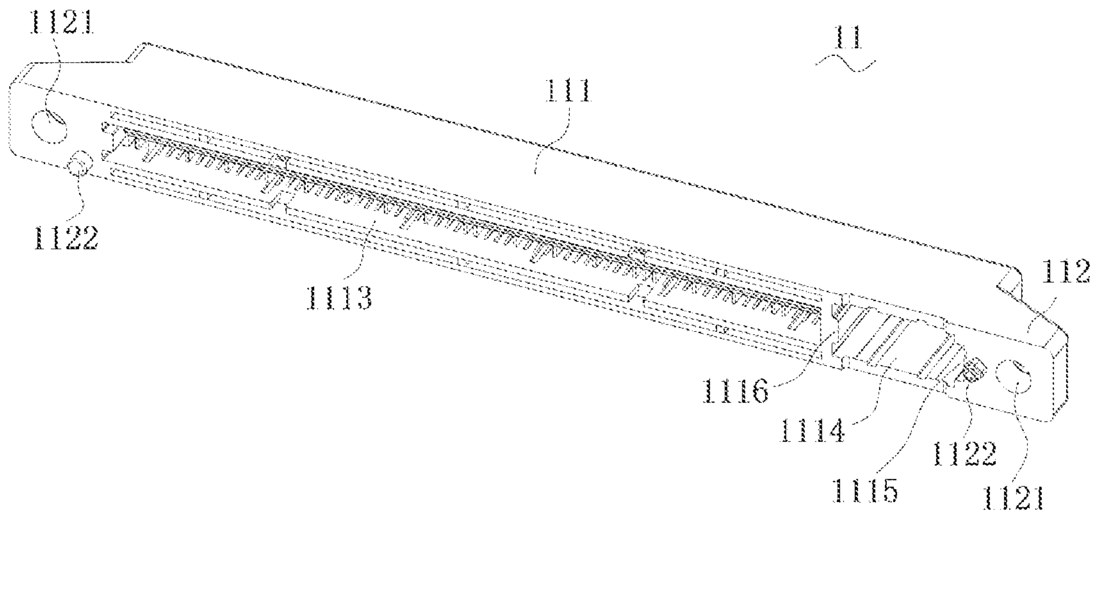
FIG. 10 is a perspective view illustrating the first insulating housing in FIG. 9 from another viewing angle.

Referring primarily to FIG. 9 and FIG. 10, the first insulating housing 11 includes a main body 111 and two mounts 112 respectively extending from two lateral sides of the main body 111. A mounting hole 1121 is provided on the mount 112, so as to correspondingly communicate with the fixing hole 24 on the circuit board 2, and the mount 112 is fixed by means of the fastener 3. A rear end of the mount 112 is provided with two positioning protruding columns 1122 protruding and extending backwards. The two positioning protruding columns 1122 can correspondingly extend into the positioning holes 25 of the circuit board 2. The first insulating housing 11 may be integrally injection molded by using an insulating material.

The main body 111 is substantially of a rectangular bar-shaped structure extending laterally. A front end of the main body 111 is provided with a first coupling cavity 1111 and a plurality of first terminal cavities 1112 respectively located on upper and lower sides of the first coupling cavity 1111. The first coupling cavity 1111 extends laterally from one side of the main body 111 to the other side, and is spaced apart from the other side edge by a spacing. The plurality of first terminal cavities 1112 located on the upper side of the first coupling cavity 1111 are arranged laterally side by side, and the plurality of first terminal cavities 1112 located on the lower side of the first coupling cavity 1111 are also arranged laterally side by side. A side of each first terminal cavity 1112 facing the first coupling cavity 1111 communicates with the first coupling cavity 1111.

A rear end of the main body 111 is provided with a mounting cavity 1113. The mounting cavity 1113 communicates with the first coupling cavity 1111 and these first terminal cavities 1112.

A receiving cavity 1114 running from the front to the back is further provided on a lateral side of the first coupling cavity 1111 of the main body 111, and the receiving cavity 1114 is located between the first coupling cavity 1111 and the other side edge of the main body 111. One side wall of the receiving cavity 1114 is provided with a slide slot 1115 that is recessed therein, and the other side wall opposite thereto is provided with a rib 1116 that protrudes inwards. The slide slot 1115 and the rib 1116 both extend in a front-rear direction.

Figure 3:
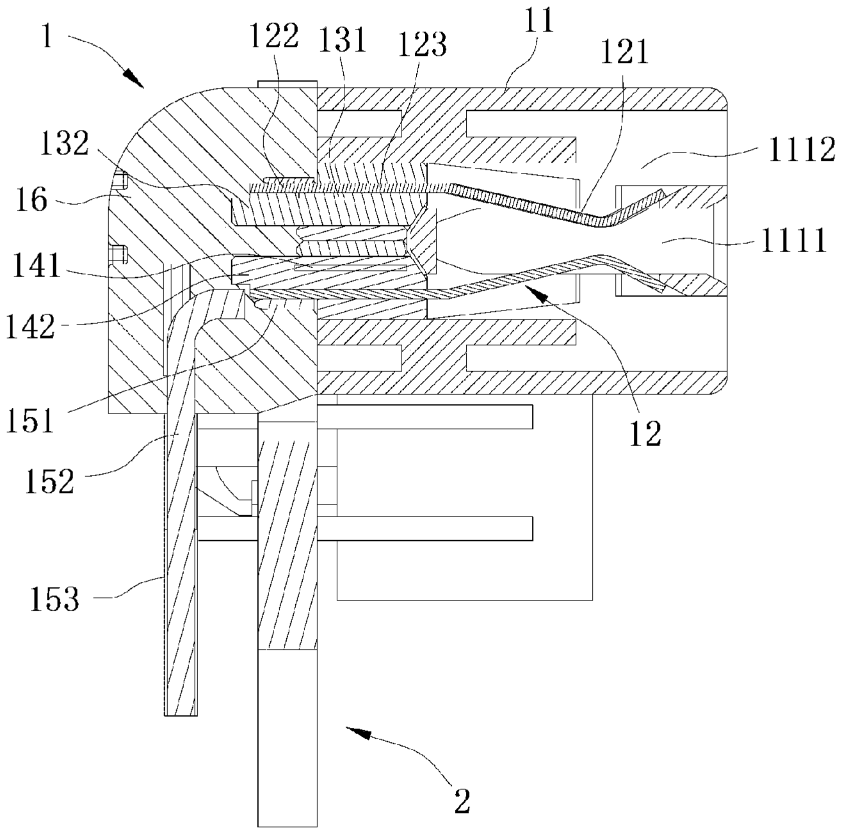
FIG. 3 is a cross-sectional view taken along line A-A in FIG. 2.
Figure 4:
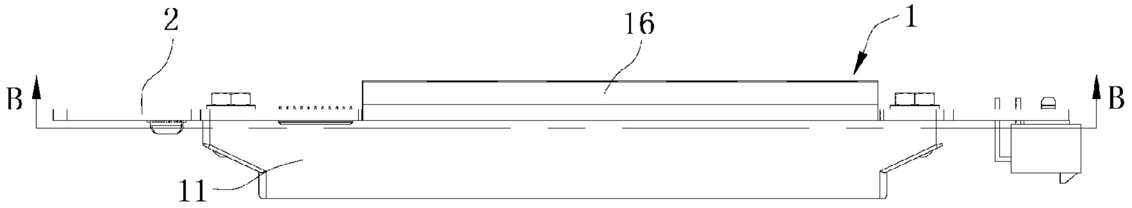
FIG. 4 is a top view of FIG. 2.
Figure 5:
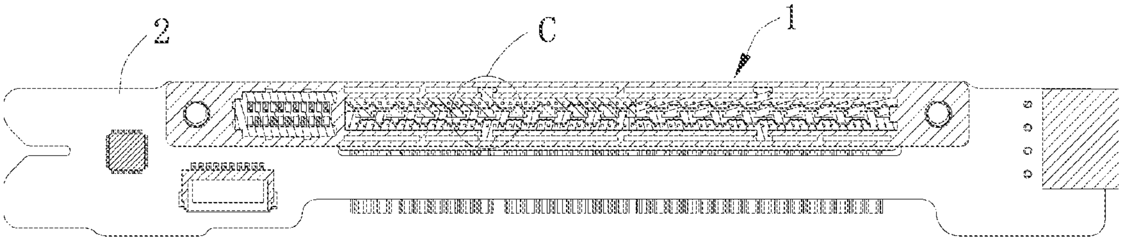
FIG. 5 is a cross-sectional view taken along line B-B in FIG. 4.
Figure 6:
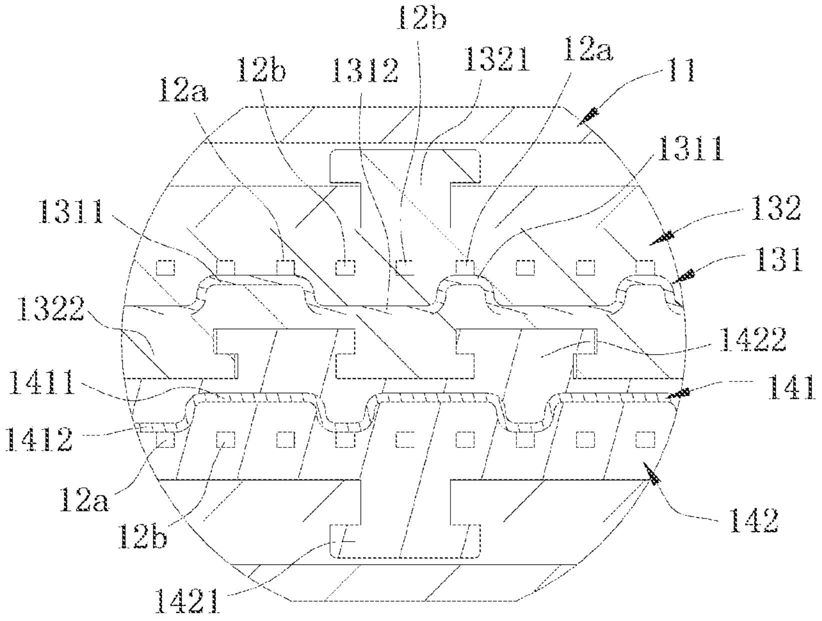
FIG. 6 is a partial enlarged view of portion C in FIG. 5.

Referring to FIG. 3 and FIG. 9, the plurality of first conductive terminals 12 are divided into upper and lower rows. The plurality of first conductive terminals 12 in each row are laterally spaced apart from each other. These first conductive terminals 12 respectively extend into the first terminal cavities 1112 of the first insulating housing 11. Correspondingly, these first conductive terminals 12 are respectively provided on upper and lower sides of the first coupling cavity 1111. In a preferred embodiment, as shown in FIG. 6, each row of the plurality of first conductive terminals 12 includes a plurality of ground terminals 12*a* for grounding and a plurality of signal terminals 12*b* for transmitting high-speed differential signals. At least four of the first conductive terminals 12 are arranged in a ground terminal 12*a*-signal terminal 12*b*-signal terminal 12*b*-ground terminal 12*a* manner. That is, in the laterally adjacent four first conductive terminals 12, two signal terminal 12*b* that are adjacent to each other are arranged in the middle, and the other two ground terminals 12*a* are respectively arranged on two sides of the two signal terminals 12*b*. The two signal terminals 12*b* that are adjacent to each other form a differential signaling pair.

Each first conductive terminal 12 includes a first contact portion 121 bending and extending forwards, a wiring portion 122 extending backwards, and a first connecting portion 123 connected between the first contact portion 121 and the wiring portion 122. The first conductive terminal 12 can be integrally formed by bending a metal sheet.

In this preferred embodiment, the wiring portion 122 and the first connecting portion 123 are both in the shape of a flat sheet extending in a front-rear direction, and the first contact portion 121 bends and extends forwards from the first connecting portion 123 so as to form a U shape. Two ends of the first contact portion 121 extend into the first terminal cavities 1112 of the first insulating housing 11, and a middle portion thereof protrudes and extends inwards into the first coupling cavity 1111. The wiring portion 122 extends backwards out of a rear end of the first insulating housing 11.

In this preferred embodiment, the plurality of first conductive terminals 12 in the upper row and a first shielding plate 131 are combined on a first terminal module 13. The first terminal module 13 is preferably formed by means of an insertion molding process.

In particular, the first terminal module 13 has a first fixed base 132. The first fixed base 132 combines the plurality of first conductive terminals 12 and the first shielding plate 131 into a whole. The first fixed base 132 completely covers the first shielding plate 131 and the first connecting portions 123 of the plurality of first conductive terminals 12, but the wiring portions 122 of the first conductive terminals 12 are exposed on a surface of the first fixed base 132. The first contact portions 121 of the first conductive terminals 12 extend forwards out of the first fixed base 132.

Figure 11:
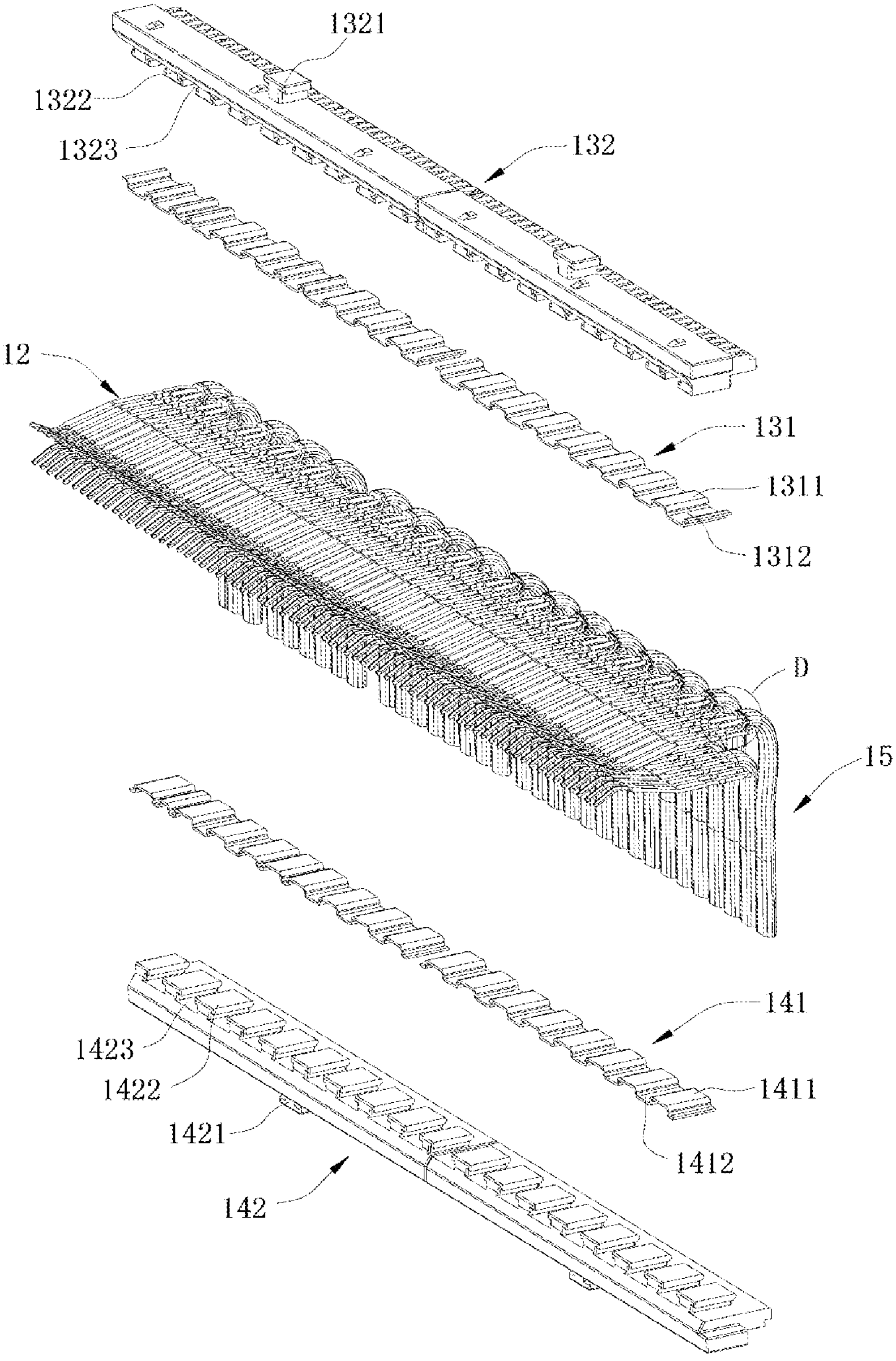
FIG. 11 is an exploded perspective view of the terminal module in FIG. 9.

Referring to FIG. 11, the top of the first fixed base 132 is provided with two first mounting protrusions 1321 protruding and extending upwards, and a cross-section of the first mounting protrusion 1321 is T-shaped.

The bottom of the first fixed base 132 is provided with a plurality of first engagement protrusions 1322 and a plurality of first engagement slots 1323. The first engagement protrusions 1322 and the first engagement slots 1323 are arranged alternately laterally. That is, one first engagement slot 1323 is formed between two adjacent first engagement protrusions 1322. A cross-section of the first engagement protrusion 1322 is in the shape of an inverted T, and a cross-section of the first engagement slot 1323 is correspondingly T-shaped.

In this embodiment, the first fixed base 132 is formed by combining two portions laterally. In other embodiments not shown, the first fixed base 132 may also be a monolithic structure.

Still referring to FIG. 11, the first shielding plate 131 is wavy, and extends in an arrangement direction of the first conductive terminals 12, that is, extending laterally. The first shielding plate 131 has a plurality of first crest portions 1311 and a plurality of first trough portions 1312 arranged alternately up and down, and each first crest portion 1311 is connected to the adjacent two first trough portions 1312 with a smooth transition. The first shielding plate 131 may be formed by bending a metal plate.

With reference to FIG. 6, the first shielding plate 131 is provided between the upper and lower rows of the first conductive terminals 12, that is, below the upper row of the first conductive terminals 12. The first shielding plate 131 contact the ground terminals 12*a* of the upper row of the first conductive terminals 12, and none of the signal terminals 12*b* of the upper row of the first conductive terminals 12 contacts the first shielding plate 131.

Specifically, the first connecting portions 123 of the first conductive terminals 12 in the upper row are arranged along the same level into one row, and the respective first crest portions 1311 of the first shielding plate 131 respectively contact the first connecting portions 123 of the ground terminals 12*a* of the upper row, and are spaced apart from the signal terminals 12*b* of the upper row both laterally and vertically. An extended length of each first crest portion 1311 may be determined on the basis of the number of ground terminals 12*a* that the first crest portion 1311 needs to contact. For example, when only one ground terminal 12*a* needs to be contacted, that is, when two sides of the ground terminal 12*a* are both signal terminals 12*b*, the extended length of the first crest portion 1311 that correspondingly contacts the ground terminal 12*a* is correspondingly set to be relatively small. When two adjacent ground terminals 12*a* need to be contacted, the first crest portion 1311 that correspondingly contacts the two ground terminals 12*a* has is a relatively large extended length.

Each first trough portion 1312 of the first shielding plate 131 is spaced apart from the signal terminals among the first conductive terminals 12 in the upper row in an up-down direction by a spacing, and an extended length of each first trough portion 1312 is set to allow the signal terminals 12*b* among the first conductive terminals 12 in the upper row to pass therethrough.

The specific arrangement of the first crest portions 1311 and the first trough portions 1312 of the first shielding plate 131 is determined on the basis of the arrangement of the ground terminals 12*a* and the signal terminals 12*b* among the first conductive terminals 12 in the upper row. For the four first conductive terminals 12 arranged in the ground terminal 12*a*-signal terminal 12*b*-signal terminal 12*b*-ground terminal 12*a* manner shown in FIG. 6, the two ground terminals 12*a* located on two sides respectively contact the two first crest portions 1311 adjacent thereto, and the two signal terminals 12*b* located in the middle are spaced apart in an up-down direction from the first trough portion 1311 between the adjacent two first crest portions 1311 by a spacing.

In this embodiment, the first shielding plate 131 is laterally divided into two portions correspondingly respectively covered by the two portions of the first fixed base 132. In other embodiments not shown, the first shielding plate 131 may also be a monolithic structure.

The first shielding plate 131 provided between the upper and lower rows of the first conductive terminals 12 reduces signal crosstalk between the upper and lower rows of the first conductive terminals 12, thereby improving signal transmission quality. In addition, the first shielding plate 131 is wavy, and is grounded by means of the contact between the first crest portion 1311 and the ground terminal 12*a*, so as to separate a plurality of paired signal terminals 12*b* for transmitting different differential signals, thereby further reducing crosstalk between signal terminals 12*b* of different differential signaling pairs of the upper row, and further improving signal transmission quality.

Referring to FIG. 3, FIG. 6, FIG. 9, and FIG. 11, in this preferred embodiment, the plurality of first conductive terminals 12 in the lower row and a second shielding plate 141 are combined on a second terminal module 14.

The second terminal module 14 has a second fixed base 142 covering the second shielding plate 141 and the first connecting portions 123 of the plurality of first conductive terminals 12. The second terminal module 14 is also formed by means of an insertion molding process.

The structure of the second shielding plate 141 is substantially the same as that of the first shielding plate 131. The second shielding plate 141 is wavy, and extends laterally. The second shielding plate 141 has a plurality of second crest portions 1411 and a plurality of second trough portions 1412 arranged alternately up and down.

The second shielding plate 141 is above the first conductive terminals 12 in the lower row. The first connecting portions 123 of the first conductive terminals 12 in the lower row are arranged along the same level into one row. The respective second trough portions 1412 of the second shielding plate 141 contact the ground terminals 12*a* of the first conductive terminals 12 in the lower row. The respective second crest portions 1411 are spaced apart from the first conductive terminals 12 in the lower row in an up-down direction, and the signal terminals 12*b* of the first conductive terminals 12 in the lower row are allowed to pass therethrough.

In addition to reducing the signal crosstalk between the first conductive terminals 12 in the upper and lower rows, the second shielding plate 141 further reduces signal crosstalk between the signal terminals 12*b* of differential signaling pairs in the lower row, and also achieves the effect of improving signal transmission quality.

In this preferred embodiment, the first shielding plate 131 and the second shielding plate 141 both have the good signal crosstalk reduction effect on the upper and lower rows of the first conductive terminals 12. In some other embodiments not shown, only one of the shielding plates may be kept according to actual conditions, and in addition, the shielding plate may also be designed to have other shapes as required.

The bottom of the second fixed base 142 is provided with two second mounting protrusions 1421 protruding and extending downwards, and a cross-section of the second mounting protrusion 1421 is in the shape of an inverted T.

The top of the second fixed base 142 is provided with a plurality of second engagement protrusions 1422 and a plurality of second engagement slots 1423. The second engagement protrusions 1422 and the second engagement slots 1423 are arranged alternately laterally.

The second engagement protrusions 1422 of the second fixed base 142 and the first engagement slots 1323 of the first fixed base 132 engage with each other, and correspondingly the second engagement slots 1423 and the first engagement protrusions 1322 of the first fixed base 132 engage with each other, so that the first fixed base 132 and the second fixed base 142 can be combined with each other, that is, combining the first terminal module 13 and the second terminal module 14 into a whole. Thus, the first terminal module 13 and the second terminal module 14 can be together easily mounted in the first insulating housing 11, so that the respective first conductive terminals 12 correspondingly extend into the respective first terminal cavities 1112, and the relative positional relationship between the first conductive terminals 12 can be firmly maintained. The first fixed base 132 and the second fixed base 142 are inserted into and connected to the mounting cavity 1113 of the first insulating housing 11, and the first mounting protrusions 1321 of the first fixed base 132 and the second mounting protrusions 1421 of the second fixed base 142 are respectively fixed to the first insulating housing 11 by means of engagement.

Figure 12:
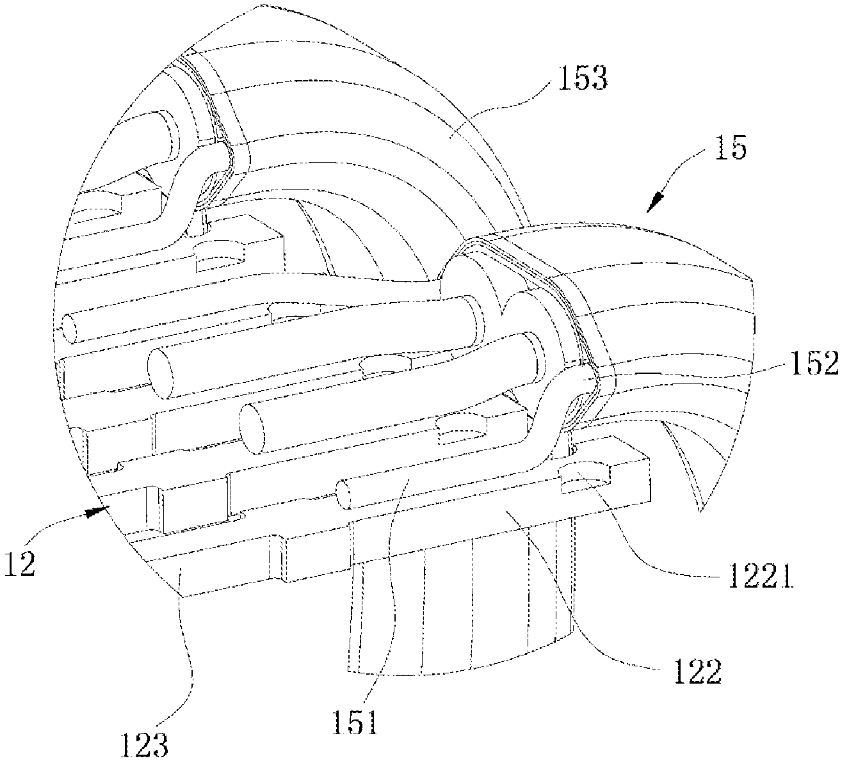
FIG. 12 is a partial enlarged view of portion D in FIG. 11.

Referring to FIG. 3, FIG. 11, and FIG. 12, the plurality of conducting wires 15 are respectively electrically connected to the wiring portions 122 of the plurality of first conductive terminals 12. It should be noted that a notch 1221 is provided on each of two sides of the wiring portion 122 of the first conductive terminal 12 close to a rear end edge, and the notch 1221 is substantially in the shape of a semicircle, and has the thickness being about a half of the thickness of the terminal. The notch 1221 improves the stub effect in ultra-high-frequency signal transmission performed by the first conductive terminals 12, reduces resonance generated by reflected signals, and increases impedance, thereby improving high-frequency transmission properties. In some embodiments not shown, only one notch 1221 may be provided, and the notch 1221 may be provided in an appropriate position on the rear end edge of the wiring portion 122 instead. The conducting wire 15 is preferably soldered to a position in front of the notch 1221. Alternatively, the conducting wire 15 may be connected to the first conductive terminal 12 by means of crimping, engagement, etc.

Each conducting wire 15 includes a soldering portion 151 soldered to the wiring portion 122 and a leading-out portion 152 bending and extending downwards from the soldering portion 151. The soldering portion 151 extends in a front-rear direction, and is directly soldered to the first conductive terminal 12. The leading-out portion 152 extends downwards, thereby reducing the space occupied by the electrical connector 1 in the front-rear direction, and facilitating arrangement.

The plurality of conducting wires 15 may be divided into a plurality of differential signal cables, and the leading-out portions 152 of the plurality of conducting wires 15 of each cable may be respectively wrapped together by a plurality of cable jackets 153.

Preferably, the electrical connector 1 is further provided with a protective housing 16. The protective housing 16 covers the soldering portions 151 of the plurality of conducting wires 15 and the wiring portions 122 of the plurality of first conductive terminals 12, and the leading-out portion 152 of the conducting wire 15 extends downwards from a lower surface of the protective housing 16.

The protective housing 16 may be injection molded after the plurality of conducting wires 15 are soldered to the first conductive terminals 12, so as to ensure that the plurality of conducting wires 15 are electrically connected to the first conductive terminals 12 reliably, thereby improving signal transmission stability.

Figure 13:
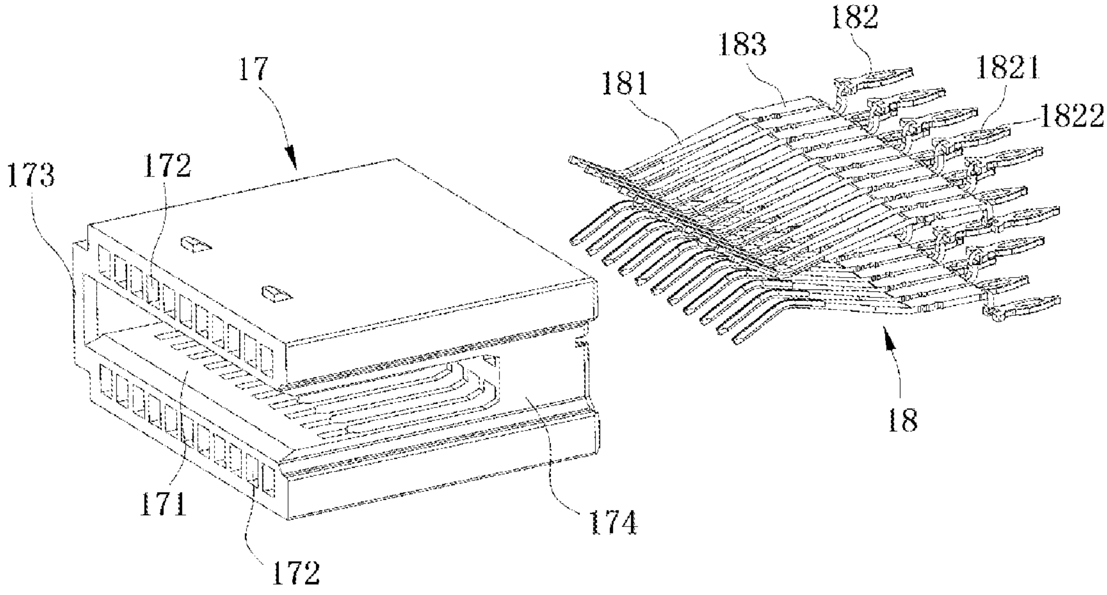
FIG. 13 is a perspective view showing the second insulating housing and the second conductive terminal of FIG. 9 in a separated state.

Referring to FIG. 9 and FIG. 13, the second insulating housing 17 is substantially in the shape of a rectangular block, and matches the receiving cavity 1114 of the first insulating housing 11, so as to be capable of being inserted into and connected to the receiving cavity 1114.

A slidable protruding portion 173 protrudes outwards from one side of the second insulating housing 17, and the other side is provided with a slot 174. The slidable protruding portion 173 and the slot 174 both extend in a front-rear direction. The slidable protruding portion 173 can be adapted to be received in the slide slot 1115 on one side of the receiving cavity 1114, and the slot 174 can be so adapted that the rib 1116 on the other side of the receiving cavity 1114 can extend thereto. In this way, the second insulating housing 17 can be easily and accurately inserted into the receiving cavity 1114, and fixed to the first insulating housing 11.

A middle portion of a front end of the second insulating housing 17 is provided with a second coupling cavity 171, and one side of the second coupling cavity 171 communicates with the slot 174.

The second insulating housing 17 is provided with a plurality of second terminal cavities 172 respectively on upper and lower sides of the second coupling cavity 171. These second terminal cavities 172 run from the front to the back.

Still referring to FIG. 9 and FIG. 13, each second conductive terminal 18 includes a second contact portion 181 extending forwards, a pin 182 extending backwards, and a second connecting portion 183 connected between the second contact portion 181 and the pin 182. The second conductive terminal 18 can be formed by bending and stamping a sheet-like substrate, and the second contact portion 181 and the first contact portion 121 have the completely identical shape and structure. With reference to FIG. 3, the first contact portion 121 of the first conductive terminal 12 is located on a front side of the opening 23 of the circuit board 2, and the plurality of conducting wires 15 are located on a rear side of the opening 23. The second contact portion 181 of the second conductive terminal 18 is also located on the front side of the opening 23. A coupling circuit board (e.g., a PCIE circuit board, not shown) may be correspondingly inserted into the first coupling cavity 171 and the second coupling cavity 172, and may be correspondingly electrically connected to the first contact portions 121 of the plurality of first conductive terminals 12 and the second contact portions 181 of the plurality of second conductive terminals 18.

The second connecting portion 183 is in the shape of a sheet extending in a front-rear direction. The pin 182 bends upwards or downwards from a rear end of the second connecting portion 183, and then extends backwards horizontally.

The plurality of second conductive terminals 18 are divided into upper and lower rows, and are respectively inserted into and connected to the plurality of second terminal cavities 172 of the second insulating housing 17, so as to be respectively provided on upper and lower sides of the second coupling cavity 171. The second contact portion 181 of each second conductive terminal 18 is exposed in the second coupling cavity 171, and the pin 182 of each second conductive terminal 18 extends backwards out of the first insulating housing 11 and the second insulating housing 17.

The pins 182 of the plurality of second conductive terminals 18 and the wiring portions 122 of the plurality of first conductive terminals 12 have different structures. As compared to that the wiring portions 122 of the plurality of first conductive terminals 12 are used to be connected to the conducting wires 5, the pins 182 of the plurality of second conductive terminals 18 are used to be connected to the electrical contacts 22 of the circuit board 2. Specifically in this embodiment, the pins 182 of the plurality of second conductive terminals 18 in each row are divided into upper and lower rows. That is, all of the pins 182 of the second conductive terminals 18 are arranged to form four rows. The arrangement of the pins 182 and the arrangement of the electrical contacts 22 of the circuit board 2 match each other, and each pin 182 can be correspondingly joined to one electrical contact 22. It will be appreciated that the arrangement of the pins 182 and the arrangement of the electrical contacts 22 can be adaptively adjusted according to actual structures.

In this preferred embodiment, a middle portion of the pin 182 is provided with a deformable hole 1821 running from the top to the bottom, so that the pin 182 has two elastically deformable arms 1822 capable of approaching each other elastically towards the deformable hole 1821. Rear ends of the two elastically deformable arms 1822 are connected to each other. The deformable hole 1821 is preferably in the shape of a bar extending in a front-rear direction. The deformable hole 1821 is of a structure having a large middle portion and small front and rear ends. The pin 182 can be inserted from the front backwards in, connected to, and run through the entire the electrical contact 22 that is a metalized through hole, and abut and be electrically connected to the electrical contact 22 by means of elasticity of the two elastically deformable arms 1822.

Figure 14:
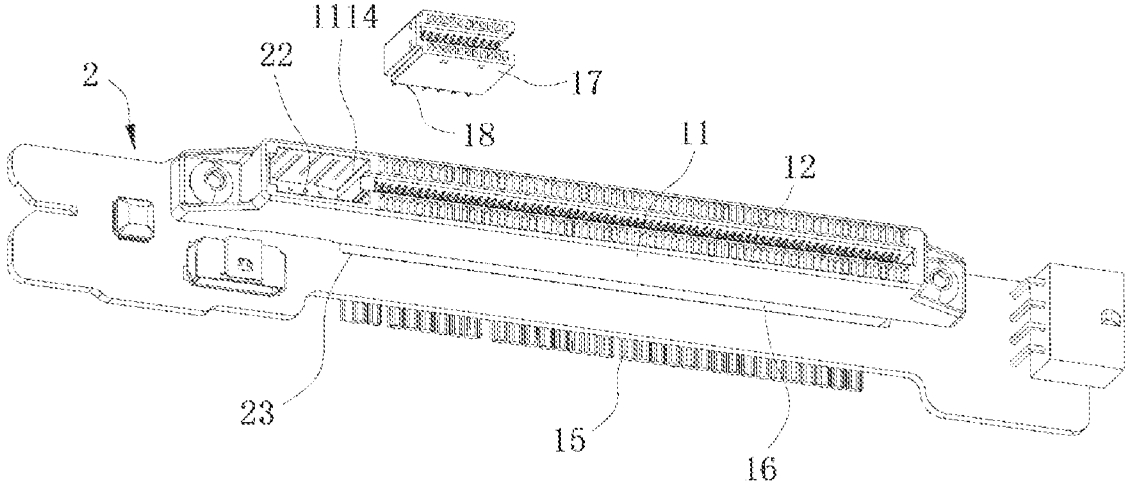
FIG. 14 is a schematic diagram showing the electrical connector combination of FIG. 1 in an intermediate state during the assembly process.

On the basis of the above description of the electrical connector 1 and the circuit board 2, an assembly process of an electrical connector combination 100 is mainly as follows: The first terminal module 13 and the second terminal module 14 are inserted together into the first insulating housing 11 from behind. The plurality of conducting wires 15 are respectively soldered to the plurality of first conductive terminals 12. Injection molding is performed to form the protective housing 16. Then, the entire structure including the first insulating housing 11, the plurality of first conductive terminals 12, and the plurality of conducting wires 15 is mounted in the opening 23 of the circuit board 2 from the above downwards. The first insulating housing 11 is fastened to the circuit board 2 by means of the fastener 3. A state at this point is shown in FIG. 14. The first insulating housing 11 is located on the front side of the circuit board 2, and the plurality of conducting wires 15 run through the opening 23, and are located on the rear side of the circuit board 2. Then, the second insulating housing 17, to which the plurality of second conductive terminals 18 are fixed, is inserted into the receiving cavity 1114 of the first insulating housing 11 from the front backwards, so that the pins 182 of the second conductive terminals 18 are correspondingly inserted into the electrical contacts 22 of the circuit board 2 so as to be electrically connected thereto.

As can be seen from the assembly process described above, since the upper side of the circuit board 2 is provided with the opening 23, the first insulating housing 11 together with the plurality of conducting wires 15 can be mounted first from the above downwards in the opening 23 of the circuit board 2. No wire needs to be inserted in the assembly process, so that these conducting wires 15 can be easily sorted. After the first insulating housing 11 is fixed on the circuit board 2, the second insulating housing 17 is inserted into the receiving cavity 1114 of the first insulating housing 11, and therefore, the pins 182 of the second conductive terminals 18 fixed on the second insulating housing 17 are electrically connected to the circuit board 2. The assembly process is easy and rapid.

It can be seen from the description of the structure of the electrical connector 1 of this preferred embodiment that, on the one hand, in the electrical connector 1, the wiring portions 122 of the first conductive terminals 12 and the pins 182 of the second conductive terminals 18 are electrically connected to different components. The wiring portions 122 of the plurality of first conductive terminals 12 are respectively electrically connected to the plurality of conducting wires 15 so as to transmit high-frequency signals. Directly connecting the first conductive terminals 12 to the conducting wires 15 ensures integrity of the high-frequency signals and reduces crosstalk, thereby improving transmission quality of high-frequency signals. The pins 182 of the plurality of second conductive terminals 18 are used to be electrically connected to electronic elements 21 on the circuit board 2, so as to use the circuit board 2 to achieve transmission of low-speed signals or a power supply, thereby leveraging the space occupied by the circuit board 2 to achieve electrical functions related to the low-speed signals or the power supply, and facilitating space conservation. Further, these second conductive terminals 18 do not need to be connected to conducting wires or an additional circuit board as described in the background, thereby reducing conducting wires in the electrical connector 1, and allowing the electrical connector 1 and the circuit board 2 to be easily assembled. In addition, the second insulating housing 17 is inserted into and connected to the first insulating housing 11 from the front backwards, so that the first insulating housing 11 can further ensure positional stability of the plurality of second conductive terminals 18, thereby improving the reliability of the electrical connection between the second conductive terminals 18 and the circuit board 2. By inserting the second insulating housing 17, the second conductive terminals 18 on the second insulating housing 17 are easily electrically connected to the circuit board, thereby allowing assembly to be easily performed.

On the other hand, in the electrical connector 1 of this preferred embodiment, the first shielding plate 131 and/or the second shielding plate 141 provided between the upper and lower rows of the first conductive terminals 12 reduces signal crosstalk between the upper and lower rows of the first conductive terminals 12, thereby improving signal transmission quality. In addition, the first shielding plate 131 and the second shielding plate 141 are wavy, and are grounded by means of the contact between the first crest portion 1311 or the second trough portion 1412 and the ground terminal 12*a*, so as to separate the plurality of paired signal terminals 12*b* arranged in the same row but belonging to different differential signaling pairs, thereby further reducing crosstalk between the signal terminals 12*b* in the same row, and further improving signal transmission quality.

The above disclosure is only preferred embodiments of the present invention, and is not intended to limit the implementation of the present invention. According to the principal concept and spirit of the present invention, those of ordinary skill in the art could easily make corresponding adaptations or modifications. Therefore, the protection scope of the present invention shall be subject to the protection scope set out by the claims.

The invention claimed is:

1. An electrical connector, capable of being fixed to a circuit board, comprising:

a first insulating housing, having a front end provided with a first coupling cavity and a receiving cavity separately provided on a lateral side of and laterally aligned with the first coupling cavity;

a plurality of first conductive terminals, respectively provided on upper and lower sides of the first coupling cavity, each first conductive terminal comprising a first contact portion extending forwards and a wiring portion extending backwards;

a plurality of conducting wires, respectively connected to the wiring portions of the plurality of first conductive terminals;

a second insulating housing comprising a second coupling cavity, the second insulating housing and the second coupling cavity being inserted into the receiving cavity of the first insulating housing from the front end of the first insulating housing; and a plurality of second conductive terminals, fixed on the second insulating housing, each second conductive terminal comprising a second contact portion extending forwards and a pin extending backwards, wherein the pin of a second conductive terminal of the plurality of second conductive terminals is used to be electrically connected to the circuit board.

2. The electrical connector according to claim 1, wherein the first contact portion of a first conductive terminal of the plurality of first conductive terminals and the second contact portion of the second conductive terminal of the plurality of second conductive terminals have the same structure, and the pin of the second conductive terminal and the wiring portion of the first conductive terminal have different structures.

3. The electrical connector according to claim 2, wherein the pin of the second conductive terminal comprises a middle portion with a deformable hole, and the pin has two elastically deformable arms capable of approaching each other elastically towards the deformable hole.

4. The electrical connector according to claim 2, wherein the wiring portion of the first conductive terminal is in the shape of a flat sheet, and at least one notch is provided in a position on the wiring portion close to a rear end, a conducting wire of the plurality of conducting wires comprising a soldering portion directly soldered to the wiring portion and a leading-out portion extending from the soldering portion.

5. The electrical connector according to claim 4, further comprising a protective housing provided behind the first insulating housing, the protective housing covering the soldering portions of the plurality of conducting wires and the wiring portions of the plurality of first conductive terminals, and the leading-out portions of the conducting wires extending downwards from a lower surface of the protective housing.

6. The electrical connector according to claim 1, wherein the plurality of second conductive terminals are respectively provided on upper and lower sides of the second coupling cavity, the second contact portion of each second conductive terminal being exposed in the second coupling cavity.

7. The electrical connector according to claim 6, wherein the second insulating housing further comprises a slidable protruding portion protruding outwardly from one side and a slot on a second side, the slot communicating with the second coupling cavity, and wherein the receiving cavity further comprises a slide slot on one side used to correspondingly receive the slidable protruding portion and a rib on a second side for correspondingly extending into the slot of the second insulating housing.

8. The electrical connector according to claim 1, wherein the plurality of first conductive terminals are divided into upper and lower rows, the electrical connector further comprises at least one shielding plate provided between the upper and lower rows of the first conductive terminals, and the shielding plate contacts some of the plurality of first conductive terminals.

9. The electrical connector according to claim 8, wherein a number of the at least one shielding plate is two, one of the shielding plates being electrically coupled with at least one ground terminal of the upper row of the first conductive terminals into a first terminal module, the other shielding plate being electrically coupled with the lower row of the first conductive terminals into a second terminal module, and the first terminal module and the second terminal module being fixed to the first insulating housing from behind.

10. An electrical connector combination according to claim 1, wherein the electrical connector is fixed on the circuit board, an upper side of the circuit board being provided with an opening, the circuit board being provided with a plurality of electronic elements and a plurality of electrical contacts located on a side of the opening, the electrical connector being fixed in the opening, and the pins of the plurality of second conductive terminals being respectively correspondingly joined to the plurality of electrical contacts, so that the plurality of second conductive terminals are electrically connected to the plurality of electronic elements by means of the circuit board.

11. The electrical connector combination according to claim 10, wherein the first contact portion of a first conductive terminal of the plurality of first conductive terminals is located on a front side of the opening, and the plurality of conducting wires are located on a rear side of the opening, the second contact portion of the second conductive terminal of the plurality of second conductive terminals being also located on the front side of the opening, an electrical contact of the plurality of electrical contacts being a metalized through hole, and the pin running from the front backwards through and being connected in the electrical contact.

12. An electrical connector, comprising:

a first insulating housing, having a front end provided with a first coupling cavity and a receiving cavity separately provided on a lateral side of and laterally aligned with the first coupling cavity;

a second insulating housing comprising a second coupling cavity, the second insulating housing and the second coupling cavity being inserted into the receiving cavity of the first insulating housing from the front end of the first insulating housing and being fixed in the receiving cavity;

a plurality of first conductive terminals, each first conductive terminal comprising a first contact portion extending forwards, a wiring portion extending backwards, and a first connecting portion located between the first contact portion and the wiring portion, the plurality of first conductive terminals being divided into upper and lower rows respectively provided on upper and lower sides of the first coupling cavity, and the plurality of first conductive terminals comprising a plurality of ground terminals and a plurality of signal terminals;

a first shielding plate, located between the upper and lower rows of the first conductive terminals, the first shielding plate being wavy, and extending in an arrangement direction of the first conductive terminals, and the first shielding plate having a plurality of first crest portions and a plurality of first trough portions arranged alternately up and down, wherein one or more of the first connecting portions of the plurality of first conductive terminals contact the first shielding plate; and a plurality of conducting wires, respectively electrically connected to the wiring portions of the first conductive terminals.

13. The electrical connector according to claim 12, wherein the first shielding plate is contacted to one row of the first conductive terminals into a first terminal module, and the first crest portions or the first trough portions contact the plurality of ground terminals.

14. The electrical connector according to claim 13, further comprising a second shielding plate, the second shielding plate being located between the upper and lower rows of the first conductive terminals, and being contacted to the other row of the first conductive terminals into a second terminal module, the second shielding plate being wavy, and extending in the arrangement direction of the first conductive terminals, and the second shielding plate having a plurality of second crest portions and a plurality of second trough portions arranged alternately up and down, wherein only the plurality of ground terminals of the first conductive terminals contact the first shielding plate.

15. The electrical connector according to claim 14, wherein the first terminal module and the second terminal module are correspondingly provided with a plurality of engagement protrusions and a plurality of engagement slots engaging each other, and are combined by means of the engagement protrusions and the engagement slots, and the first terminal module and the second terminal module are both fixed in the first insulating housing.

16. The electrical connector according to claim 13, wherein the first connecting portions of the first conductive terminals in the upper row are arranged along the same level into one row, wherein at least four of the first conductive terminals are arranged in a ground terminal-signal terminal-signal terminal-ground terminal manner, wherein two ground terminals located on two sides respectively contact two first crest portions adjacent thereto, and two signal terminals located in the middle are spaced apart in an up-down direction from a first trough portion between adjacent two first crest portions by a spacing.

17. The electrical connector according to claim 12, further comprising a plurality of second conductive terminals fixed on the second insulating housing, wherein each second conductive terminal comprises a second contact portion extending forwards and a pin extending backwards.

18. The electrical connector according to claim 12, wherein at least one notch is provided in a position on a wiring portion of the wiring portions close to a rear end, and a conducting wire of the plurality of conducting wires is directly connected to the wiring portion of the corresponding first conductive terminal.

19. The electrical connector according to claim 18, wherein a second notch is provided opposite a side of the at least one notch on the wiring portion close to the rear end, and the conducting wire is soldered to a position in front of the at least one notch.

20. The electrical connector according to claim 18, wherein a second notch is provided at the rear end of the wiring portion, and the conducting wire is directly soldered to the wiring portion of the first conductive terminal.

* * * * *